UNITED STATES PATENT OFFICE.

WILLARD E. CASE, OF AUBURN, NEW YORK.

PROCESS OF MAKING ALUMINUM COMPOUNDS.

SPECIFICATION forming part of Letters Patent No. 503,901, dated August 22, 1893.

Application filed November 5, 1891. Renewed January 21, 1893. Serial No. 459,499. (No specimens.)

*To all whom it may concern:*

Be it known that I, WILLARD E. CASE, of Auburn, Cayuga county, New York, have invented a new and useful Improvement in Processes for the Manufacture of Aluminum Compounds, of which the following is a specification.

The object of my invention is to produce an aluminum compound which from its constitution and physical properties is capable of many uses in the arts.

A further object of my invention is to obtain this product free from iron, while producing it from crude materials containing iron as an impurity.

In the manufacture of this product I have found that the removal of the aforesaid iron impurity is facilitated if it is all brought to the ferric form, and as it may often happen that the crude materials employed may contain iron in the ferrous form, I have invented a process by which this ferrous iron may all be made ferric prior to or at the time of its separation from the product which I produce.

My process is as follows: Supposing a sample of aluminum sulphate to be used which contains iron in both the ferrous and ferric forms as an impurity. I dissolve this sulphate in water, preferably heating the solution to 180° Fahrenheit to expedite the subsequent reaction, and, having previously ascertained the quantity of iron present in ferrous condition, I add a suitable quantity of nitric and sulphuric acids to oxidize said ferrous iron to the ferric condition, in accordance with the well known formula which represents said reaction, and I prefer to add said acids in slightly greater quantities than is indicated by the requirements of said reaction. I next add a quantity of calcium fluoride, preferring, on account of its cheapness, commercial ground fluor-spar. The temperature of the solution now being preferably maintained for several hours, a reaction takes place which may probably be represented by the following formula:

$$Al_2(SO_3) + 2CaF_2 = Al_2F_4(SO_4) + 2CaSO_4.$$

I next separate, by filtration or otherwise, the precipitated calcium sulphate, (together with such excess of calcium fluoride as remains undecomposed,) from the resulting fluor-sulphate solution. For the next step I consider it advisable, although not essential, that this solution should have a specific gravity of about 1.040. I next prepare an aqueous solution of an alkali carbonate, such as sodium carbonate, or soda-ash, and for convenience I prefer to use a saturated solution for this purpose. I now add the alkali carbonate solution to the fluor-sulphate solution, (which causes a reddish ferruginous precipitate,) until upon removing, filtering, and testing a small sample of this solution with potassium ferrocyanide, it shows itself to be substantially free from iron in the ferric form; and then by filtration or otherwise, I remove the said iron precipitate. The alkali carbonate solution is now added to the fluor-sulphate solution until it ceases to bring down a further quantity of a white precipitate, and this white precipitate I prefer to remove at once from said solution by filtration or otherwise. This product is rich in aluminum and free from such iron as may have been present in the original aluminum sulphate. It is of particular value as a source of aluminum to be extracted by electrolysis or otherwise, and its physical properties render it useful for other purposes.

I claim—

1. The process of producing aluminum, or aluminum-sodium, fluosulphate, free, or substantially free, from iron, which consists in treating an aqueous solution of crude aluminum sulphate with nitric and sulphuric acids, adding calcium fluoride, then adding a solution of an alkali carbonate to precipitate iron, and then mechanically separating the liquid from the solid products of the reaction.

2. The process of producing aluminum, or aluminum-sodium, fluosulphate, free, or substantially free, from iron, which consists in treating an aqueous solution of crude aluminum sulphate with nitric and sulphuric acids, adding calcium fluoride, then adding a solution of sodium carbonate to precipitate iron, and then mechanically separating the liquid from the solid products of the reaction.

3. The process of producing an insoluble aluminum compound, free, or substantially free, from iron, which consists in treating an aqueous solution of crude aluminum sulphate with nitric and sulphuric acids, adding calcium fluoride, then adding a solution of an alkali carbonate to precipitate iron, removing said iron, and then treating said solution with a further quantity of said alkali carbonate to cause precipitation of said aluminum compound.

4. The process of producing an insoluble aluminum compound, free, or substantially free, from iron, which consists in treating an aqueous solution of crude aluminum sulphate with nitric and sulphuric acids, adding calcium fluoride, then adding a solution of sodium carbonate to precipitate iron, removing said iron, and then treating said solution with a further quantity of said sodium carbonate to cause precipitation of said aluminum compound.

WILLARD E. CASE.

Witnesses:
C. E. GOODRICH,
GEORGE W. NELLIS.